(12) United States Patent
Uken et al.

(10) Patent No.: US 8,851,690 B2
(45) Date of Patent: Oct. 7, 2014

(54) MOUNTING ASSEMBLY FOR VEHICLE INTERIOR MIRROR

(75) Inventors: John T. Uken, Jenison, MI (US); Donald S. Rawlings, Caledonia, MI (US)

(73) Assignee: Magna Mirrors of America, Inc., Holland, MI (US)

(*) Notice: Subject to any disclaimer, the term of this patent is extended or adjusted under 35 U.S.C. 154(b) by 836 days.

(21) Appl. No.: 12/912,253

(22) Filed: Oct. 26, 2010

(65) Prior Publication Data

US 2011/0096427 A1    Apr. 28, 2011

Related U.S. Application Data

(60) Provisional application No. 61/255,192, filed on Oct. 27, 2009.

(51) Int. Cl.
*G02B 5/22* (2006.01)
*B60R 1/04* (2006.01)

(52) U.S. Cl.
CPC ....................................... *B60R 1/04* (2013.01)
USPC .......................................................... 359/875

(58) Field of Classification Search
USPC .......... 359/871–872, 875–877; 248/479, 481, 248/549; 362/494
See application file for complete search history.

(56) References Cited

U.S. PATENT DOCUMENTS

| | | |
|---|---|---|
| 541,727 A | 6/1895 | Dennis |
| 1,521,508 A | 12/1924 | Denoux |
| 1,800,797 A | 4/1931 | Hoople |
| 1,857,095 A | 5/1932 | Glowacki |
| 2,414,223 A | 1/1947 | De Virgilis |
| 2,456,182 A | 12/1948 | Goble |
| 2,763,188 A | 9/1956 | Bertell |
| 2,856,815 A | 10/1958 | Ross |
| 2,921,808 A | 1/1960 | David |
| 2,973,980 A | 3/1961 | Vogt et al. |
| 3,009,712 A | 11/1961 | Williams |
| 3,022,096 A | 2/1962 | Schwartz |
| 3,104,897 A | 9/1963 | Berger |
| 3,177,020 A | 4/1965 | Dumpis |

(Continued)

FOREIGN PATENT DOCUMENTS

| | | |
|---|---|---|
| GB | 1132384 | 10/1968 |
| WO | WO 2004/026633 A2 | 4/2004 |

(Continued)

*Primary Examiner* — Stephone B Allen
*Assistant Examiner* — Kimberly N Kakalec
(74) *Attorney, Agent, or Firm* — Gardner, Linn, Burkhart & Flory, LLP

(57) ABSTRACT

An interior rearview mirror assembly includes a mirror head and a mounting assembly for adjustably mounting the mirror head at an interior portion of a vehicle. The mounting assembly includes a mounting structure that is attachable to an interior portion of the vehicle and includes a mirror mounting element pivotally attached at an end of the mounting structure to establish a mirror ball pivot joint. The attaching portion of the mirror mounting element is configured to attach to a receiving portion of the mirror head via a snap connection and/or a twist connection. The attaching portion of the mirror mounting element, when the mirror mounting element is attached at the end of the mounting structure, is attachable to the receiving portion of the mirror head from a position rearward of the mirror casing and from exterior the mirror casing to attach the mirror head at the mounting structure.

23 Claims, 10 Drawing Sheets

(56) References Cited

U.S. PATENT DOCUMENTS

| | | |
|---|---|---|
| 3,367,616 A | 2/1968 | Bausch et al. |
| 3,374,016 A | 3/1968 | Melton et al. |
| 3,448,553 A | 6/1969 | Herr et al. |
| 3,498,579 A | 3/1970 | Vicary |
| 3,530,495 A | 9/1970 | Kindel |
| 3,601,352 A | 8/1971 | Jensen et al. |
| 3,622,112 A | 11/1971 | Stroh |
| 3,635,435 A | 1/1972 | Perison, Sr. |
| 3,774,996 A | 11/1973 | Donnelly |
| 3,841,769 A | 10/1974 | Bowerman |
| 3,870,404 A | 3/1975 | Wilson et al. |
| 4,254,931 A | 3/1981 | Aikens et al. |
| 4,319,806 A | 3/1982 | Brandenburg |
| 4,359,264 A | 11/1982 | Zeigler et al. |
| 4,382,572 A | 5/1983 | Thompson |
| 4,435,042 A | 3/1984 | Wood et al. |
| 4,436,371 A | 3/1984 | Wood et al. |
| 4,492,488 A | 1/1985 | Warshawsky |
| 4,524,941 A | 6/1985 | Wood et al. |
| 4,614,412 A | 9/1986 | Cohen |
| 4,632,348 A | 12/1986 | Keesling et al. |
| 4,646,210 A | 2/1987 | Skogler et al. |
| 4,679,906 A | 7/1987 | Brandenburg |
| 4,712,879 A | 12/1987 | Lynam et al. |
| 4,807,096 A | 2/1989 | Skogler et al. |
| 4,822,140 A | 4/1989 | Mittelhauser |
| 4,826,289 A | 5/1989 | Vandenbrink et al. |
| 4,882,565 A | 11/1989 | Gallmeyer |
| 4,930,742 A | 6/1990 | Schofield et al. |
| 4,936,533 A | 6/1990 | Adams et al. |
| 4,948,242 A | 8/1990 | Desmond et al. |
| 5,058,851 A | 10/1991 | Lawlor et al. |
| 5,073,012 A | 12/1991 | Lynam |
| 5,076,673 A | 12/1991 | Lynam et al. |
| 5,100,093 A | 3/1992 | Rawlinson |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,308,247 A | 5/1994 | Dyrdek |
| 5,327,288 A | 7/1994 | Wellington et al. |
| 5,406,414 A | 4/1995 | O'Farrell et al. |
| 5,521,760 A | 5/1996 | De Young et al. |
| 5,525,264 A | 6/1996 | Cronin et al. |
| 5,555,136 A | 9/1996 | Waldmann et al. |
| 5,567,360 A | 10/1996 | Varaprasad et al. |
| 5,572,354 A | 11/1996 | Desmond et al. |
| 5,576,687 A | 11/1996 | Blank et al. |
| 5,582,383 A | 12/1996 | Mertens et al. |
| 5,610,756 A | 3/1997 | Lynam et al. |
| 5,632,092 A | 5/1997 | Blank et al. |
| 5,668,663 A | 9/1997 | Varaprasad et al. |
| 5,669,698 A | 9/1997 | Veldman et al. |
| 5,671,996 A | 9/1997 | Bos et al. |
| 5,673,994 A | 10/1997 | Fant, Jr. et al. |
| 5,680,263 A | 10/1997 | Zimmermann et al. |
| 5,724,187 A | 3/1998 | Varaprasad et al. |
| 5,820,097 A | 10/1998 | Spooner |
| 5,878,370 A | 3/1999 | Olson |
| 5,910,854 A | 6/1999 | Varaprasad et al. |
| 5,984,482 A | 11/1999 | Rumsey et al. |
| 6,002,511 A | 12/1999 | Varaprasad et al. |
| 6,124,886 A | 9/2000 | DeLine et al. |
| 6,154,306 A | 11/2000 | Varaprasad et al. |
| 6,178,034 B1 | 1/2001 | Allemand et al. |
| 6,222,460 B1 | 4/2001 | DeLine et al. |
| 6,227,675 B1 | 5/2001 | Mertens et al. |
| 6,227,689 B1 | 5/2001 | Miller |
| 6,229,319 B1 | 5/2001 | Johnson |
| 6,250,148 B1 | 6/2001 | Lynam |
| 6,315,421 B1 | 11/2001 | Apfelbeck et al. |
| 6,318,870 B1 | 11/2001 | Spooner et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,428,172 B1 | 8/2002 | Hutzel et al. |
| 6,439,755 B1 | 8/2002 | Fant, Jr. et al. |
| 6,483,438 B2 | 11/2002 | DeLine et al. |
| 6,501,387 B2 | 12/2002 | Skiver et al. |
| 6,523,964 B2 | 2/2003 | Schofield et al. |
| 6,540,193 B1 | 4/2003 | DeLine |
| 6,593,565 B2 | 7/2003 | Heslin et al. |
| 6,598,980 B2 | 7/2003 | Marusawa et al. |
| 6,690,268 B2 | 2/2004 | Schofield et al. |
| 6,774,356 B2 | 8/2004 | Heslin et al. |
| 6,795,111 B1 | 9/2004 | Mazzilli |
| 6,824,281 B2 | 11/2004 | Schofield et al. |
| 6,847,487 B2 | 1/2005 | Burgner |
| 6,877,709 B2 | 4/2005 | March et al. |
| 6,877,888 B2 | 4/2005 | DeLine et al. |
| 6,983,920 B2 | 1/2006 | DeLine |
| 7,004,593 B2 | 2/2006 | Weller et al. |
| 7,110,156 B2 | 9/2006 | Lawlor et al. |
| 7,156,358 B2 | 1/2007 | March et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,209,278 B2 | 4/2007 | Lawlor et al. |
| 7,249,860 B2 | 7/2007 | Kulas et al. |
| 7,255,451 B2 | 8/2007 | McCabe et al. |
| 7,264,217 B2 | 9/2007 | DeLine et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,370,983 B2 | 5/2008 | DeWind et al. |
| 7,446,650 B2 | 11/2008 | Schofield et al. |
| 7,510,287 B2 | 3/2009 | Hook |
| 7,538,316 B2 | 5/2009 | Heslin et al. |
| 7,626,749 B2 | 12/2009 | Baur et al. |
| 7,855,755 B2 | 12/2010 | Weller et al. |
| 2003/0128131 A1* | 7/2003 | Skiver et al. ............... 340/815.4 |
| 2005/0078389 A1 | 4/2005 | Kulas et al. |
| 2006/0038668 A1 | 2/2006 | DeWard et al. |
| 2006/0050018 A1 | 3/2006 | Hutzel et al. |
| 2006/0061008 A1 | 3/2006 | Karner et al. |
| 2006/0082192 A1 | 4/2006 | Dubay et al. |
| 2006/0132939 A1 | 6/2006 | Blank et al. |
| 2006/0255960 A1 | 11/2006 | Uken et al. |
| 2007/0019426 A1 | 1/2007 | Uken |
| 2007/0096005 A1* | 5/2007 | March et al. .................. 248/549 |
| 2008/0030883 A1* | 2/2008 | Oehmann ..................... 359/871 |
| 2008/0055757 A1* | 3/2008 | Uken et al. .................... 359/872 |
| 2010/0091394 A1 | 4/2010 | Dewind |
| 2010/0097469 A1 | 4/2010 | Blank et al. |

FOREIGN PATENT DOCUMENTS

| | | |
|---|---|---|
| WO | WO 2004/042457 A2 | 5/2004 |
| WO | WO 2004/076971 A2 | 9/2004 |
| WO | WO 2010/124064 A1 | 10/2010 |

* cited by examiner

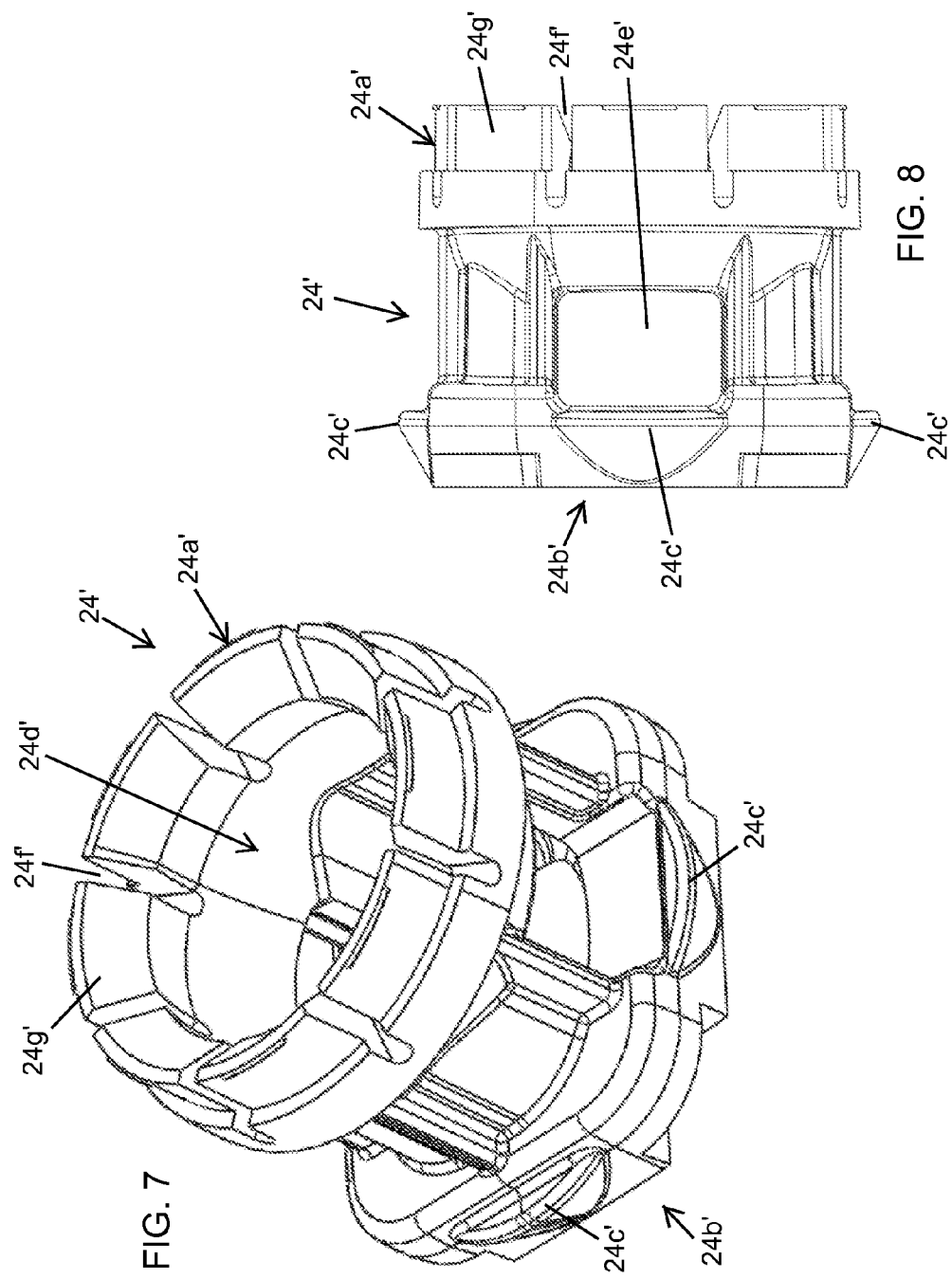

MOUNTING ASSEMBLY FOR VEHICLE INTERIOR MIRROR

CROSS REFERENCE TO RELATED APPLICATION

The present application claims the benefit of U.S. provisional application Ser. No. 61/255,192, filed Oct. 27, 2009, which is hereby incorporated herein by reference in its entirety.

FIELD OF THE INVENTION

The present invention relates generally to the field of rearview mirror assemblies for vehicles and, more particularly, to an interior rearview mirror assembly that is mounted to an interior portion of a vehicle.

BACKGROUND OF THE INVENTION

It is known to provide a mirror assembly that comprises a mirror casing that is adjustable relative to an interior portion of a vehicle, such as via a double ball pivot joint or double ball pivot mounting configuration, where the mirror casing and reflective element disposed thereat are adjustable by the driver of the vehicle relative to the interior portion of a vehicle by pivotal movement about a ball pivot arm or configuration so as to set the rearward field of view of the reflective element to a driver's need/preference when the interior rearview mirror assembly is normally mounted in a vehicle. In some applications, a mirror assembly may be adjustably mounted to an interior portion of a vehicle via a double ball pivot joint or double pivot mounting configuration or single ball pivot joint or single pivot mounting configuration.

SUMMARY OF THE INVENTION

The present invention provides an interior rearview mirror assembly having a mirror head (such as a mirror head comprising a mirror casing and reflective element) mounted at an interior portion of a vehicle via a mounting configuration that allows a user (such as the driver of the vehicle equipped with the mirror assembly) to adjust a rearward field of view of the reflective element via pivotal adjustment of the mirror head about a pivot joint or ball pivot joint. The mounting configuration includes a mounting arm attached to or formed with a mounting base that is attached at the interior portion of the vehicle, with the mounting arm extending from the mounting base and having a mirror mounting element or ball member pivotally attached thereat. The mirror mounting element may be configured to attach to the mirror head (such as to the mirror casing and/or reflective element assembly) from exterior the mirror casing, such as via a snap-together connection or a twist-lock or bayonet or threaded or fastener connection or the like. Optionally, the mounting configuration may include a mirror mounting element, such as a ball member, that is integrally or unitarily formed, such as by injection molding, with the bezel of the mirror assembly.

According to an aspect of the present invention, an interior rearview mirror assembly for a vehicle comprises a mirror head having a mirror casing and a reflective element, such as a reflective element positioned at a bezel portion of the casing, and a mounting assembly for adjustably mounting the Mirror head at an interior portion of a vehicle that is equipped with the mirror assembly. The mounting assembly comprises a mounting structure that is attachable to an interior portion of the equipped vehicle (such as a mounting base attached at the interior portion of the vehicle and having a ball member established thereat or such as a mounting base attached at the interior portion of the vehicle and having a mounting arm pivotally attached thereto). A mirror mounting element of the mounting assembly is pivotally attached at an end of the mounting structure to establish a mirror ball pivot joint. The end of the mounting structure is opposite the interior portion of the equipped vehicle when the mounting structure is attached to the interior portion of the equipped vehicle. The mirror head comprises a receiving portion configured to receive an attaching portion of the mirror mounting element. The attaching portion of the mirror mounting element is configured to attach to the receiving portion via a snap together connection or twist lock connection or bayonet connection or the like. The attaching portion of the mirror mounting element, when the mirror mounting element is attached at the end of the mounting structure, is attachable to the receiving portion of the mirror head from a position rearward of the mirror casing and from the exterior of the mirror casing to pivotally attach the mirror head at the end of the mounting structure.

The mirror mounting element thus is configured to attach to the mirror casing and/or reflective element assembly from the rear of the mirror casing and exterior of the casing, such as via insertion into a pocket or receiving portion or connecting portion of the mirror casing. For example, the mirror mounting portion, when attached at the end of the mounting arm or mounting structure, may be attached to the mirror casing via a snap together connection or twist lock connection or bayonet connection or threaded connection or fastener connection or the like. The reflective element is adjustable about the mirror joint to adjust a rearward field of view of a driver of a vehicle when the mirror assembly is normally mounted in the vehicle.

According to another aspect of the present invention, an interior rearview mirror assembly for a vehicle includes a bezel portion, a mirror mounting element and a reflective element disposed at the bezel portion. The mirror mounting element is unitarily formed with the bezel portion (such as by plastic molding or injection molding and such as by injection molding and over-molding of a base portion of the mirror mounting element about an insert molded ball portion, such as a metallic ball portion or the like) and is configured to pivotally attach to a mounting arm of a mounting assembly for adjustably mounting the mirror assembly at an interior portion of a vehicle that is equipped with the mirror assembly. The mirror mounting element is disposed at a rear of the reflective element when the reflective element is disposed at the bezel portion.

The mirror mounting element may comprise an attachment plate that encompasses at least a portion of the rear surface of the reflective element, and a ball member may extend from the attachment plate for pivotally attaching the bezel portion to the mounting arm of the mounting assembly (optionally, a socket may be formed at the attachment plate for pivotally receiving a ball member of a mounting arm therein). The mirror mounting element is adjustably joined to a perimeter portion of the bezel portion, and the mirror mounting element is adjustable between an open configuration, wherein the reflective element may be received in the bezel portion, and a closed configuration, wherein the mirror mounting element is disposed at the rear of the reflective element. The mirror mounting element may be pivotally joined to the perimeter portion of the bezel portion via a living hinge.

Therefore, the present invention provides a ball member that may be pivotally attached to the mounting arm of a mounting assembly and then attached at the rear of the mirror head, such as to the mirror casing and/or reflective element. Thus, instead of a typical attachment plate with an insert molded ball stud (which is typically crimped and the mirror housing must pass over the bracket assembly), the ball member of the present invention may be larger for a particular mirror application (and may comprise zinc or other die cast material or a glass-fiber reinforced polyamide, such as, for example, a glass fiber 50 percent reinforced polyamide MXD6 commercially available from Mitsubishi Engineering-Plastics Corporation under the name RENY® or the like, if performance allows) or may be insert molded into a smaller structural piece that either snaps or threads or cam-locks or twist locks onto the mirror housing and assembles from the outside or rear of the housing. Optionally, the ball member may also or otherwise adhere directly to the reflective element, such as to a foam tape at the rear of the reflective element (such as an electro-optic reflective element or cell) and the adjacent portions of the mirror housing and structural ribs may also adhere to the reflective element. Such a construction allows for the use of larger mounts including a mount or ball joint that may have a connector holding feature on it (that may not fit through a typical housing construction). Such a construction also gives a direct transfer of adjustment force (when the user grabs the mirror housing to adjust the mirror rearward field of view, the force travels through the mirror housing directly to the ball member).

The present invention also provides a unitarily formed bezel portion and mirror attachment element for attaching the bezel portion and reflective element to a mounting arm of a mirror mounting assembly. The mirror attachment element may comprise a ball member that may be folded or pivoted about a living hinge at a portion of the bezel to move the ball member so as to be disposed at the rear of the reflective element after the reflective element is received at the bezel. Such a construction reduces the number of components of the mirror assembly and enhances the assembly process of the mirror assembly.

These and other objects, advantages, purposes and features of the present invention will become apparent upon review of the following specification in conjunction with the drawings.

BRIEF DESCRIPTION OF THE DRAWINGS

FIG. 7 is a perspective view of a ball socket mounting structure in accordance with the present invention;

FIG. 8 is a side elevation of the ball socket mounting structure of FIG. 7;

DESCRIPTION OF THE PREFERRED EMBODIMENTS

Figure 1:
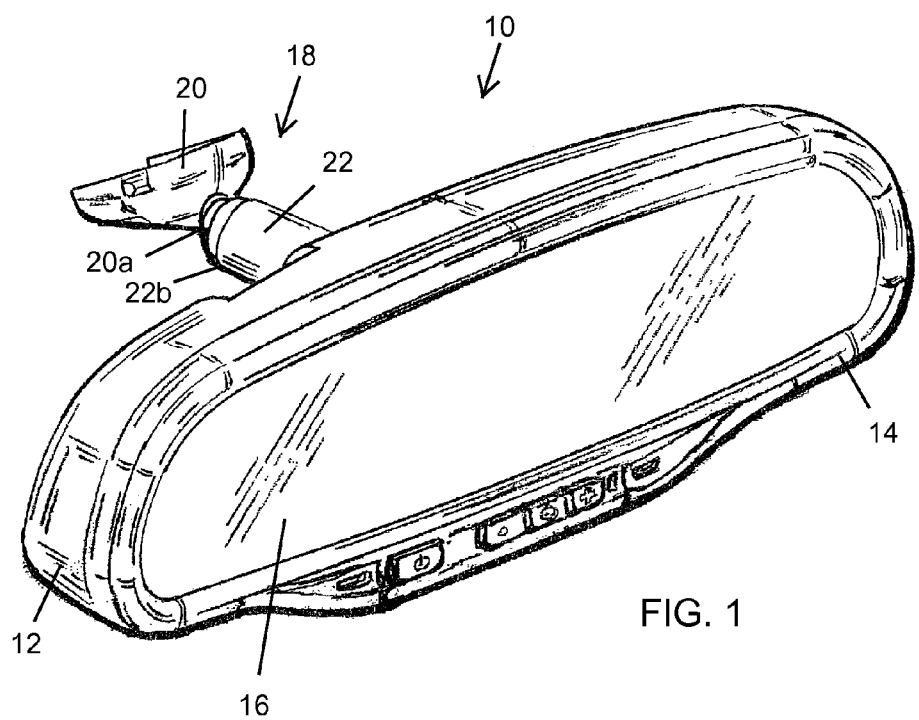
FIG. 1 is a perspective view of an interior rearview mirror assembly and mounting structure in accordance with the present invention.
Figure 2:
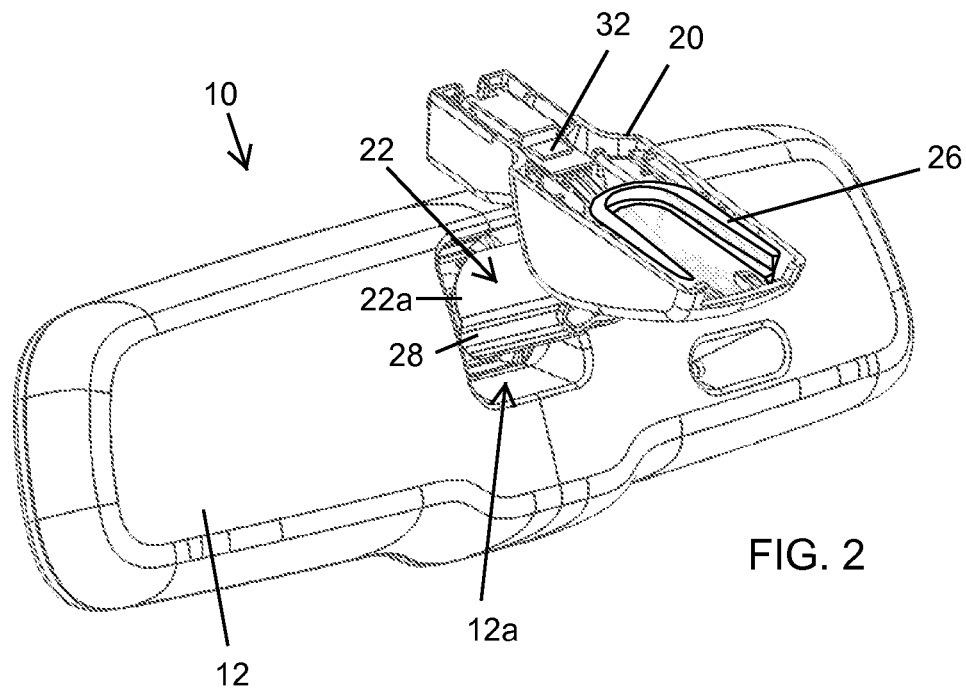
FIG. 2 is a rear perspective view of the interior rearview mirror assembly and mounting structure of FIG. 1.

Referring now to the drawings and the illustrative embodiments depicted therein, an interior rearview mirror assembly 10 for a vehicle includes a casing 12, a bezel portion 14 and a reflective element 16 positioned at and at least partially within the casing and/or bezel portion (FIG. 1). Mirror assembly 10 is adjustably mounted at an interior portion of a vehicle (such as at an in-cabin surface of a vehicle windshield or a headliner of a vehicle or the like) via a double ball pivot mounting configuration or assembly 18 (although optionally, the mirror assembly may be mounted via a single ball pivot mounting configuration or assembly). Mounting assembly 18 includes a mounting structure comprising base portion or mounting base or breakaway stay or mirror mount 20 and a mounting arm 22. The mounting arm 22 pivotally attaches to a mirror mounting element 24 (in the illustrated embodiment, the mounting arm pivotally receives a ball member of the mirror mounting element) at an outer or rearward or mirror end 22a of mounting arm 22 and the mounting arm and ball member may be assembled together prior to connection of the mirror mounting element to the mirror casing and/or reflective element, whereby the mirror mounting element 24 may be attached to the mirror casing and/or reflective element via a snap together or twist lock or bayonet type or threaded or fastener connection or the like, as discussed below.

The reflective element 16 and mirror casing 12 are attached to the mirror mounting element 24 and thus pivotally mounted at outer or rearward or mirror end 22a of mounting arm 22 about a mirror ball pivot joint (such as a ball and socket joint or the like that allows for a driver of the vehicle to which mirror assembly 10 is mounted to adjust the reflective element vertically and horizontally to adjust the rearward field of view of the driver). The opposite or forward or base end 22b of mounting arm 22 is adjustably mounted to mounting base 20 about a second or adjustable or base joint, such as at a ball portion 20a of mounting base 20, which allows for vertical and horizontal adjustment of the reflective element 16. Mounting base 20 is attached to an interior surface of a vehicle windshield (such as to a mounting button or attachment element 26 adhered to the interior surface of the vehicle windshield) and extends downwardly from the attachment location. The mounting base may be mounted to a mounting button or attachment element at the vehicle windshield via any suitable construction, such as a breakaway mounting construction, and such as by utilizing aspects of the mounting constructions described in U.S. Pat. Nos. 6,250,148; 5,820,097; 5,100,095; 5,058,851; and/or 4,930,742, which are hereby incorporated herein by reference in their entireties. Although shown and described as a double ball or double pivot mounting arrangement, aspects of the present invention may be used in a single ball or single pivot mounting arrangement and/or in other adjustable mounting arrangements, such as the types described in PCT Application No. PCT/US2010/028130, filed Mar. 22, 2010, which is hereby incorporated herein by reference in its entirety.

Figure 6:
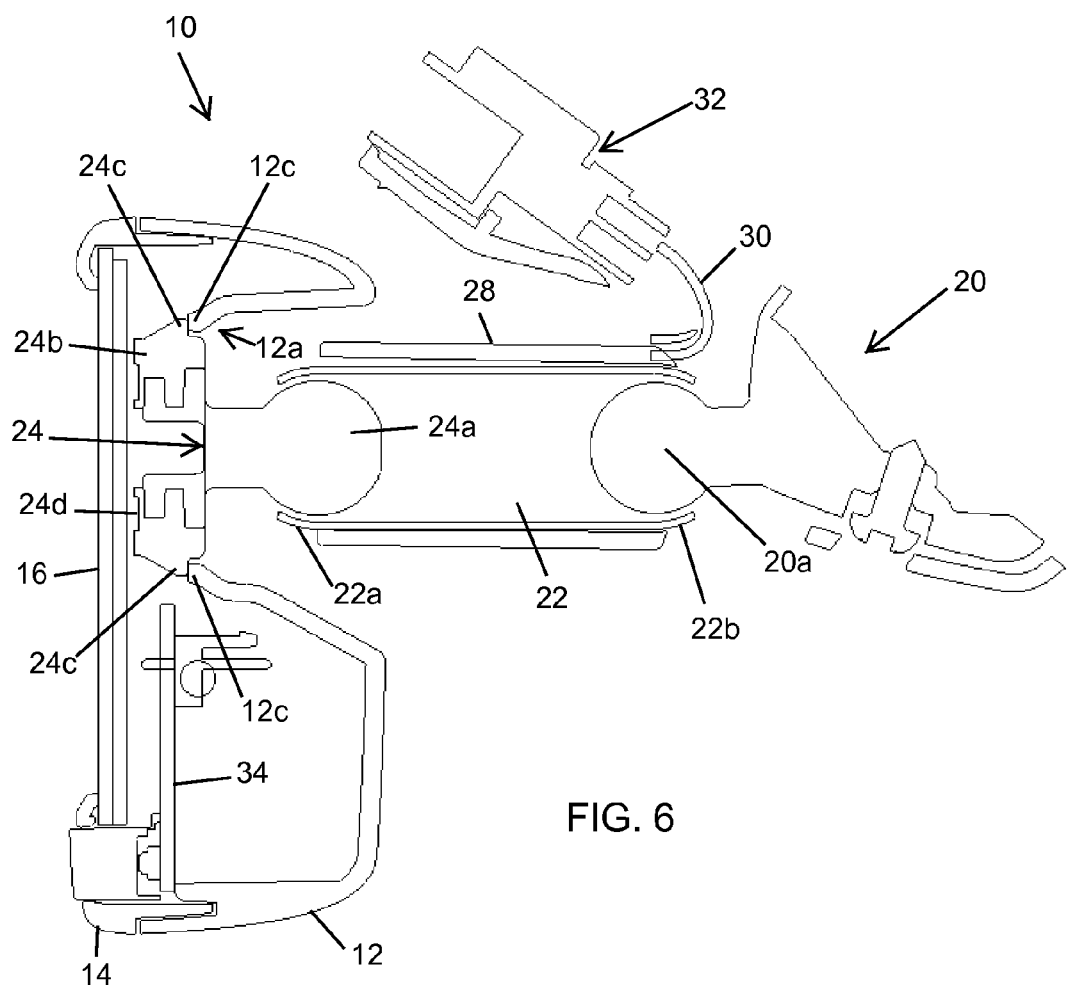
FIG. 6 is a sectional view of the interior rearview mirror assembly and mounting structure of FIGS. 1 and 2.

As shown in FIG. 6, the mirror joint comprises a ball pivot joint or ball and socket type joint that allows for 360 degree adjustment of the reflective element relative to mounting arm 22. In the illustrated embodiment, mirror end 22a of mounting arm 22 comprises a socket that pivotally receives the generally spherical or partially spherical ball portion 24a of mirror mounting element or ball member 24, while a base end 22b of mounting arm 22 comprises a socket that pivotally receives a ball portion 20a of base portion 20 at the interior portion of the vehicle. Mounting arm 22 and/or mirror mounting element 24 and/or base portion may comprise molded (such as injection molded) polymeric components or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005, which published on Mar. 23, 2006 as U.S. Patent Publication No. 2006/00061008, which are hereby incorporated herein by reference in their entireties).

The mirror mounting element 24 includes an attachment portion or base portion 24b that is attached to the mirror casing 12 and/or at the rear of the reflective element 16. As shown in FIG. 6, ball portion 24a may be insert molded at base portion 24b of mirror mounting element 24, whereby the ball portion 24a may comprise a metallic material and the base portion may comprise a polymeric or plastic material.

Figure 3:
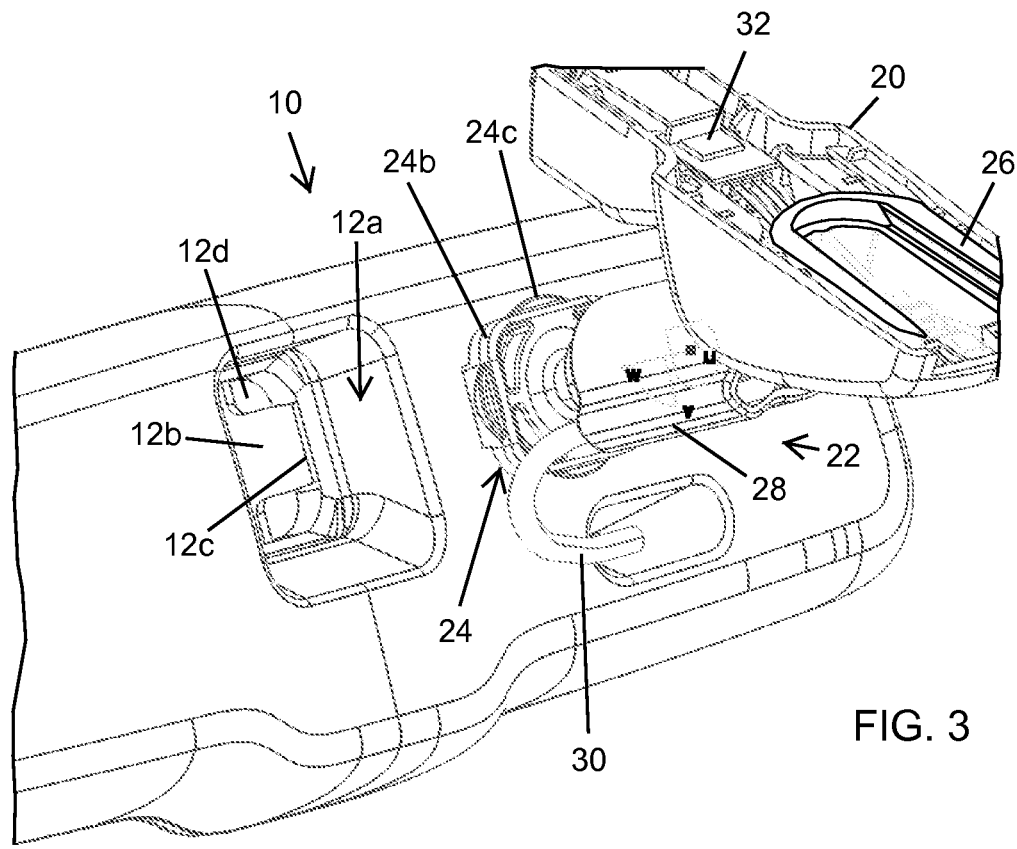
FIG. 3 is an exploded rear perspective view of the interior rearview mirror assembly and mounting structure of FIGS. 1 and 2.
Figure 4:
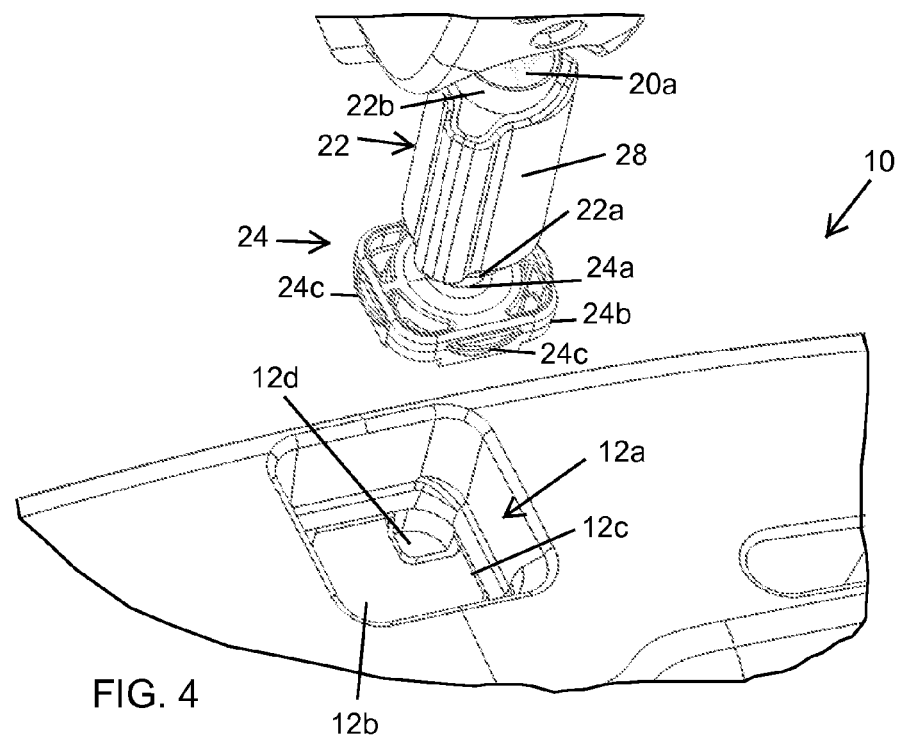
FIG. 4 is another exploded rear perspective view of the interior rearview mirror assembly and mounting structure of FIGS. 1 and 2.
Figure 5:
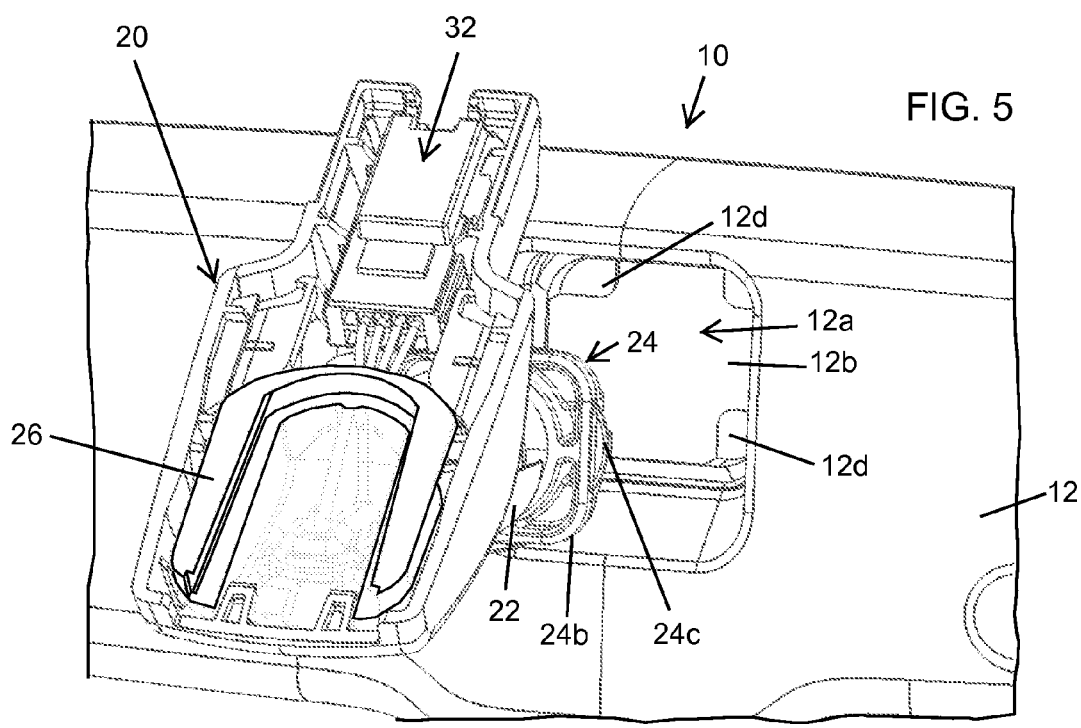
FIG. 5 is another exploded rear perspective view of the interior rearview mirror assembly and mounting structure of FIGS. 1 and 2.

In the illustrated embodiment, base portion 24b of mirror mounting element 24 is configured to attach to a mirror casing attachment portion 12a, which may comprise a recessed area at the rear of the casing and an aperture 12b at least partially through the mirror casing 12, from the rear of the mirror casing and to be snapped in place at the mirror casing to secure the base portion 24b relative to the mirror casing 12. As shown in FIGS. 3-7, base portion 24b includes a plurality of locking or retaining tabs 24c that extend radially outwardly from the base portion, while mirror casing attachment portion 12a includes a plurality of notches or tabs 12c at aperture 12b for receiving and retaining tabs 24c when base portion 24b is inserted into aperture 12b of mirror casing 12. In the illustrated embodiment, base portion 24b is generally square or rectangular shaped and the mirror casing attachment portion 12a comprises a generally square or rectangular shaped receptacle or socket or pocket for receiving base portion 24b at least partially therein. As shown in FIGS. 3-5, mirror casing attachment portion 12a may include tabs or stops 12d to limit insertion of base portion 24b, whereby the degree of insertion allowed is sufficient for tabs 24c to engage tabs 12c at mirror casing 12 to retain ball member 24 relative to mirror casing 12. Thus, the base portion 24b of mirror mounting element 24 (which is pivotally attached to mounting arm 22) may be inserted into the mirror casing attachment portion 12a at the mirror casing 12 to attach the mirror casing and reflective element to the mirror mounting element so as to pivotally attach the mirror casing and reflective element at the mounting arm of the mounting assembly.

Optionally, and desirably, a forward surface 24d (FIG. 6) of the base portion 24b may protrude at least partially through aperture 12b of mirror casing 12 and may be adhered or otherwise attached (such as via a foam tape or double sided tape or adhesive or the like) at a rear surface of the reflective element assembly, such as at an attachment board or plate or circuit board disposed at the rear of the reflective element. Although shown and described as providing a snap-together configuration, the mirror mounting element and mirror casing may optionally provide a twist-lock or bayonet type attachment and/or may utilize fasteners or the like to retain the ball member relative to the mirror casing, while remaining within the spirit and scope of the present invention.

Also, although shown and described as comprising a ball portion, the mirror mounting element or portion may comprise a socket portion for receiving a ball portion or ball member at the mirror end of the mounting arm, while remaining within the spirit and scope of the present invention. For example, and with reference to FIGS. 7 and 8, a mirror mounting element or ball socket member 24' may include a socket portion 24a' and an attachment portion or base portion 24b' that is attached to the mirror casing and/or at the rear of the reflective element, such as in a similar manner as described above. Socket portion 24a' may be integrally or unitarily molded or formed in the same molding or forming process (such as via injection molding or the like) with base portion 24b' of mirror mounting element 24'. For example, the mirror mounting element 24' may be unitarily molded of a plastic or polymeric material, such as an acetal material, a PBT material, a polyolefin material or polypropylene material and/or the like. Socket portion 24a' comprises a plurality of slots 24f' therearound to allow for flexing of the arms or portions or tabs 24g' of the socket portion 24a' when receiving the ball member of a mounting arm or mounting base therein, whereby, when the ball member is received in socket portion 24a', the tabs or arms 24g' of the socket portion 24a' retain the ball member in mounting element 24' while allowing for pivotal movement of socket portion 24a' and mounting element 24' about the ball member of the mounting arm or mounting base of the mirror mounting assembly or construction.

In the illustrated embodiment, base portion 24b' of mirror mounting element 24' is configured to attach to the mirror casing attachment portion, which may comprise a recessed area at the rear of the casing and an aperture at least partially through the mirror casing, from the rear of the mirror casing and is configured to be snapped in place at the mirror casing to secure the base portion 24b' relative to the mirror casing. The base portion 24b' of mounting element 24' may be similar in construction and function as the base portion 24b of mounting element 24, discussed above, such that a detailed discussion of the base portions and mirror casing attachment portions need not be repeated herein. Optionally, and desirably, base portion 24b' of mounting element 24' may be configured to attach to the same mirror casing as base portion 24b of mounting element 24, such that a common mounting construction can be used to mount the mirror casing at a vehicle, with one mounting element 24' having a socket portion and thus selected for pivotally attaching the mirror head to a ball member at an end of a mounting arm or mounting base and another mounting element 24 having a ball member and thus selected for pivotally attaching the mirror head to a socket end of a mounting arm or the like.

Similar to base portion 24b, discussed above, base portion 24b' includes a plurality of locking or retaining tabs 24c' that extend radially outwardly from the base portion, while the mirror casing attachment portion may include a plurality of notches or tabs at the aperture for receiving and retaining tabs 24c' when base portion 24b' is inserted into the aperture of the mirror casing. In the illustrated embodiment, base portion 24b' is generally square or rectangular shaped for inserting into a generally square or rectangular shaped receptacle or socket or pocket of the mirror casing, such as described above. Thus, the base portion 24b' of mirror mounting element 24' may be inserted into the mirror casing attachment portion at the mirror casing to attach the mirror casing and reflective element to the mirror mounting element 24', which includes socket portion 24a' that is pivotally attached to a mounting base (such as for a single pivot joint or single ball joint mounting assembly) or a ball end of a mounting arm (such as a double ball mounting arm of a double pivot joint or double ball mounting assembly) so as to pivotally attach the mirror casing and reflective element at the mounting base or arm of the mounting assembly. In the illustrated embodiment, the mounting element 24' includes a central passageway 24d' and one or more holes or apertures 24e' at its side or sides for a wire harness or wiring to pass through (such as for a single or double ball mounting assembly with a wire or wires passing through the ball member of the base portion or mounting arm) so as to be received at or in the mirror casing for electrical connection with a connector and associated circuitry of the mirror head.

Optionally, and as shown in FIGS. 2-6, the mounting arm 22 (such as the socket ended mounting arm attached to mirror mounting element 24, as shown, or such as a mounting arm having a ball end for attachment to mirror mounting element 24' or the like) may have a wire channel or guide element 28 established along the mounting arm (such as via a plastic or polymeric or metallic clip or the like that is established at and at least partially over the outer surface of the mounting arm, such as by utilizing aspects of the mirror assemblies described in U.S. Pat. No. 6,540,193 and/or U.S. patent application Ser. No. 11/226,628, filed Sep. 14, 2005, which published on Mar. 23, 2006 as U.S. Patent Publication No. 2006/00061008, which are hereby incorporated herein by reference in their entireties) to guide a wire or cable 30 along the mounting arm 22 so as to provide electrical connection between a vehicle wire harness (such as via an electrical connection 32 at the mounting base) and mirror circuitry or accessories within the mirror casing (such as electrical circuitry and/or components established at a circuit element 34 (FIG. 6), such as a printed circuit board or the like, disposed at the rear of the reflective element). The wire or cable 30 may be routed along the mounting arm 22 and around ball member 24a of mounting element 24 and through an aperture at the rear of the mirror casing 12 (such as aperture 12b at the rear of mirror casing 12 or another aperture or notch at or near aperture 12b) so as to enter the mirror casing for establishing an electrical connection to circuitry and/or accessories therein. Optionally, the base portion 24b of ball member or mounting element 24 may include an electrical connector and may make electrical connection at a connector in the mirror casing as the base portion is mechanically attached or fastened or secured relative to the mirror casing, such as via a snap connection or twist-lock connection or threaded connection and/or the like.

Therefore, the mounting configuration or mounting assembly of the interior rearview mirror assembly of the present invention allows for attachment of the mirror mounting portion or element to the mounting structure (such as a ball or socket portion of a mirror mount attached at an in-cabin surface of the vehicle windshield such as for a single ball or single pivot mounting assembly, or such as a ball or socket end of a mounting arm pivotally attached at a mirror mount attached at an in-cabin surface of the vehicle windshield or the like such as for a double ball or double pivot mounting assembly) to establish the mirror mounting joint and subsequent attachment of the mirror mounting portion or element at the rear of the mirror head, such as to the mirror casing and/or reflective element of the mirror head. Thus, the mirror mounting element or ball member of the present invention may be larger for a particular mirror application (and may comprise zinc or other die cast material or a glass fiber reinforced polyamide, such as, for example, a glass fiber 50 percent reinforced polyamide MXD6 commercially available from Mitsubishi Engineering-Plastics Corporation under the name RENY® or the like, if performance allows) and/or may be insert molded into a smaller structural piece that either snaps or threads or cam-locks or twist locks onto the mirror housing and assembles from the outside or rear of the housing (such that the ball member need not fit through the smaller aperture of the casing, thereby facilitating use of a larger ball member at the mirror pivot joint). The mounting configuration of the present invention also provides for a universal or common attachment (such as common mirror casing mount configurations and common base portions of the ball members) while providing different size ball portions or joints (such as by insert molding different sized ball portions into common base portions) for different mirror applications. Such a construction allows for the use of larger mounts including a mount that may have a connector holding feature on it (that may not fit through a typical housing construction). Such a construction also gives a direct transfer of adjustment force (when the user grabs the mirror housing to adjust the mirror rearward field of view, the force travels through the mirror housing directly to the ball member).

Figure 9:
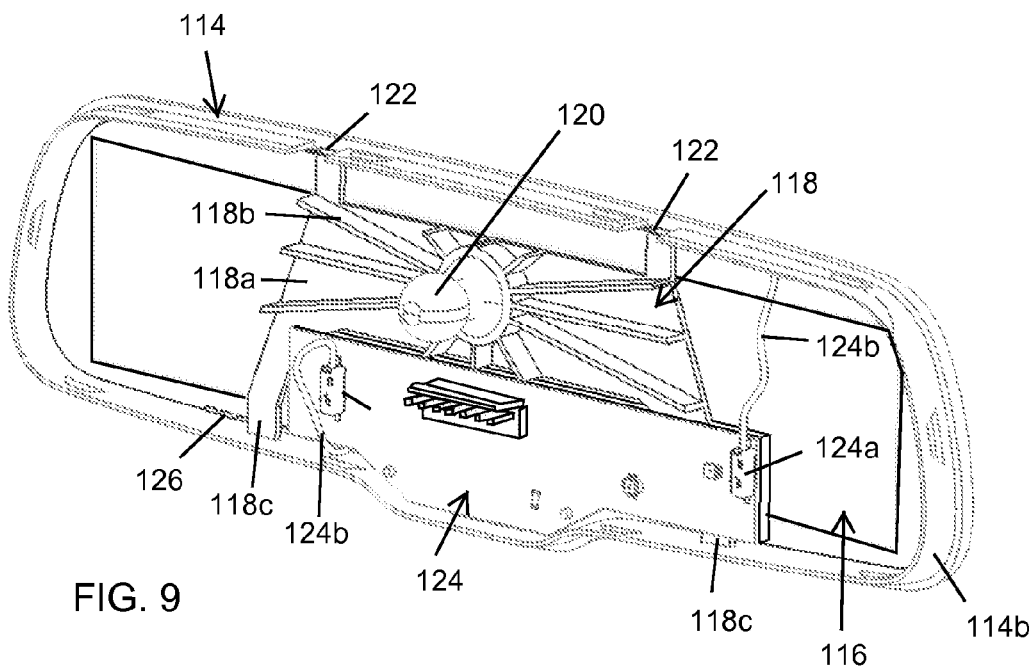
FIG. 9 is a rear perspective view of a portion of another interior rearview mirror assembly and mounting structure in accordance with the present invention, having a mirror mounting element integrally formed with a bezel portion.
Figure 10:
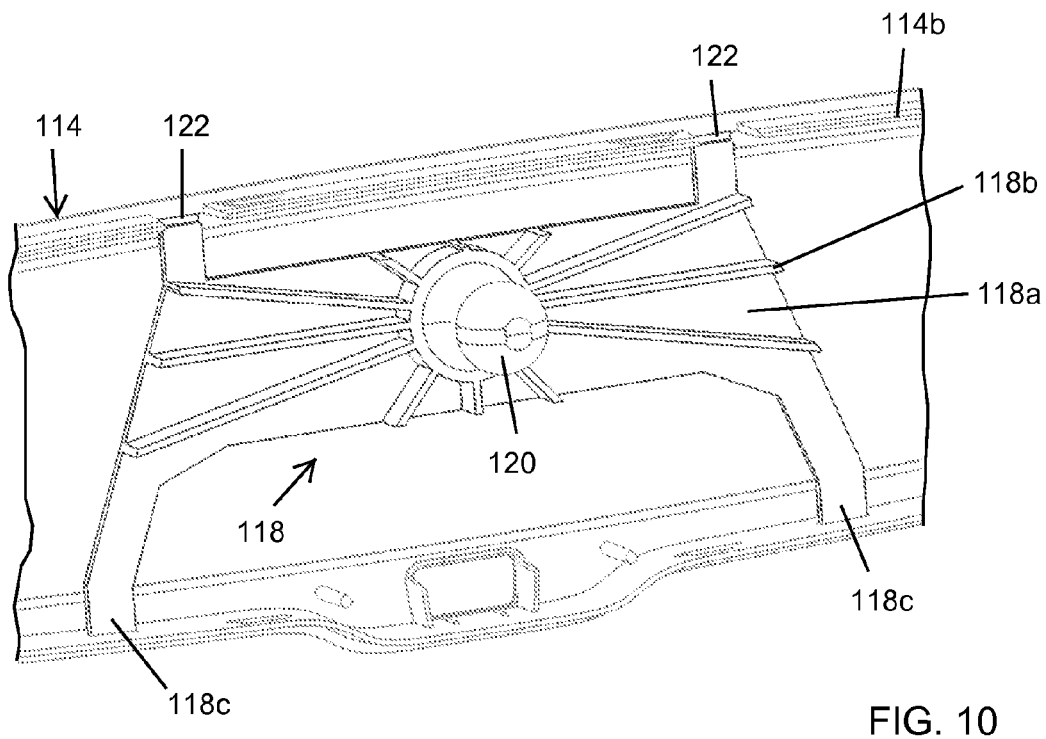
FIG. 10 is another rear perspective view of the mounting element and bezel portion of FIG. 9.

Optionally, and with reference to FIGS. 9-16, an interior rearview mirror assembly for a vehicle includes a bezel portion 114 and a reflective element 116 positioned at and at least partially within a mirror casing (not shown in FIGS. 9-16) and/or bezel portion. Bezel portion 114 receives the reflective element 116 therein (such as from the rear of the bezel portion, and a mirror mounting portion 118 is disposed at the rear of the reflective element 116 after the reflective element is received in bezel portion 114 (such as shown in FIG. 9). Mirror mounting portion 118 has a ball portion 120 extending therefrom for pivotally mounting the mirror reflective element and mirror casing to a mounting arm of a mounting assembly to pivotally or adjustably mount the mirror reflective element at an interior portion of a vehicle. Mirror mounting portion 118 is integrally or unitarily formed with bezel portion 114 and is pivotable about a joint or living hinge portion 122 to pivot the mirror mounting portion 118 between an open position (FIGS. 14-16) for receiving the reflective element 116 in bezel portion 114 and a closed or use position (FIGS. 9-13) for mounting the reflective element and bezel portion to the mounting arm of the mounting assembly, as discussed below.

Figure 11:
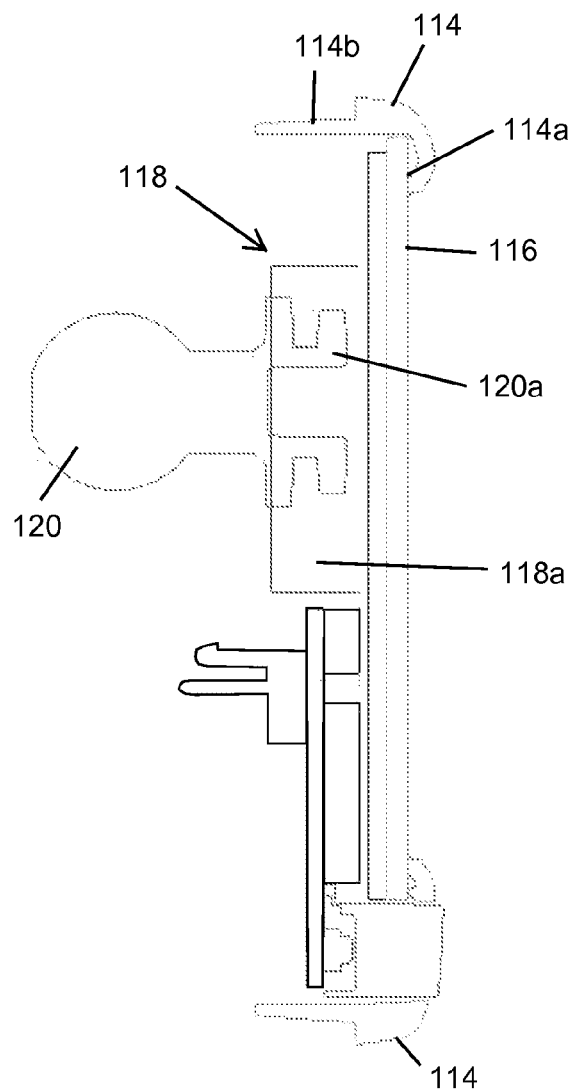
FIG. 11 is a sectional view of the portion of the interior rearview mirror assembly and mounting structure of FIG. 9.
Figure 12:
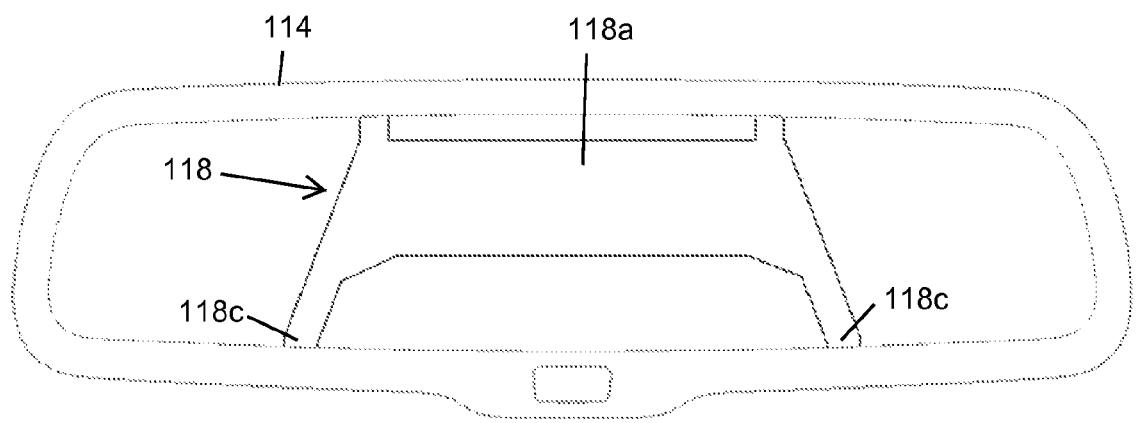
FIG. 12 is a front plan view of the portion of the interior rearview mirror assembly and mounting structure of FIG. 9.
Figure 13:
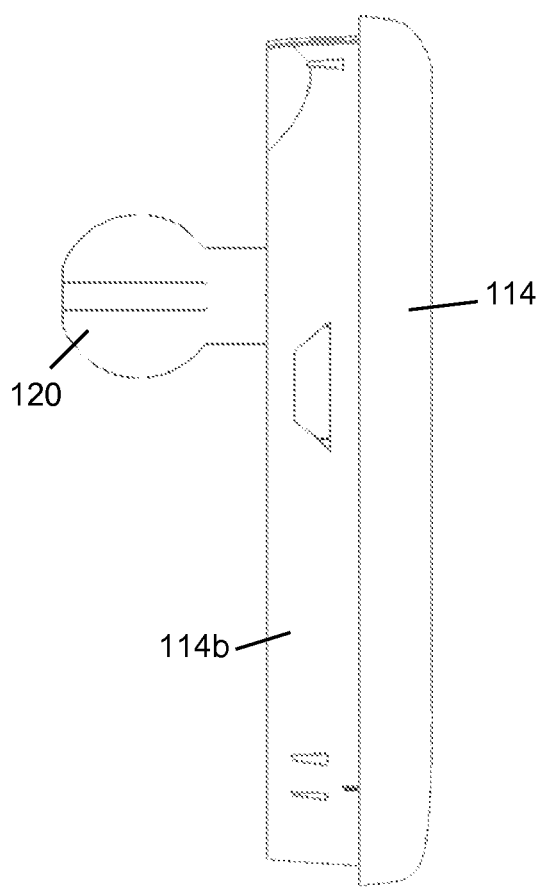
FIG. 13 is an end elevation of the mounting element and bezel portion of FIG. 10.

In the illustrated embodiment, mirror mounting portion 118 includes a generally planar panel portion or attachment plate 118a that is adjustably or hingedly mounted or attached at bezel portion 114 at living hinge portions 122. The generally planar attachment plate 118a includes a plurality of stiffening ribs 118b for enhancing the structural rigidity of the attachment plate 118a, with the ball portion 120 protruding rearwardly from a generally central region of the attachment plate 118a. Mirror mounting portion 118 includes a pair of tabs or legs 118c extending from the attachment plate 118a for engaging an opposite portion of the bezel portion 114 to secure or retain the mirror mounting portion in the use or folded down position along the rear of the reflective element when the reflective element is received in the bezel portion. Ball portion 120 may be integrally formed with mirror mounting portion 118 and bezel portion 114 or the ball portion may be insert molded at attachment plate 118a (such as shown in FIG. 11), while remaining within the spirit and scope of the present invention.

Figure 14:
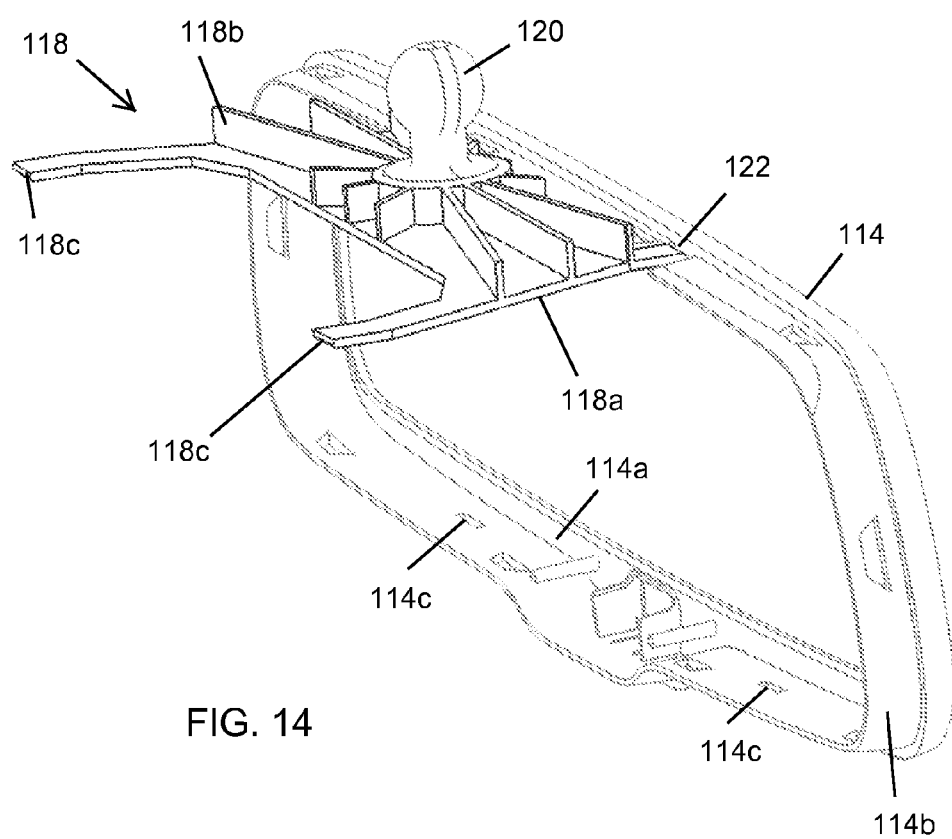
FIG. 14 is a rear perspective view of the mounting element and bezel portion of FIGS. 10 and 13, shown with the mounting structure pivoted to an open or non-use position.
Figure 15:
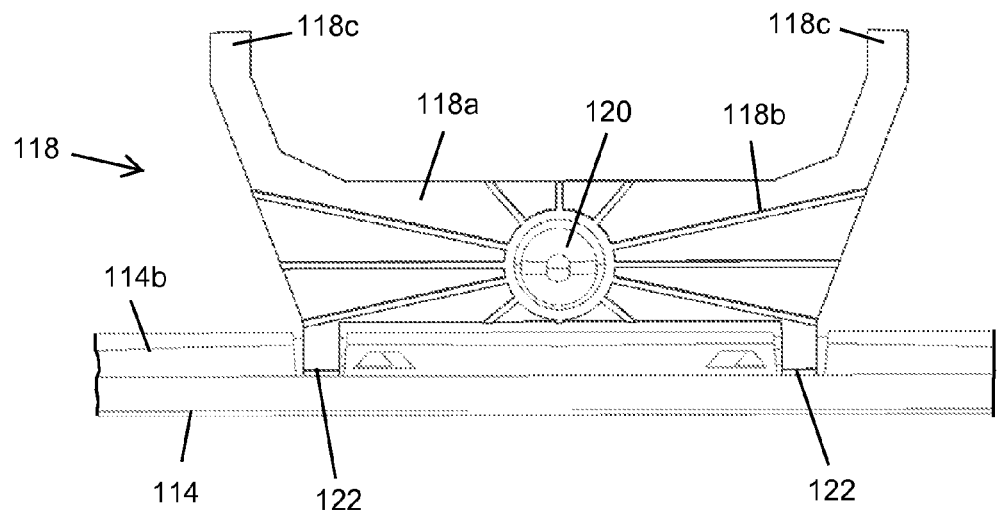
FIG. 15 is a top plan view of the mounting element and bezel portion of FIG. 14.
Figure 16:
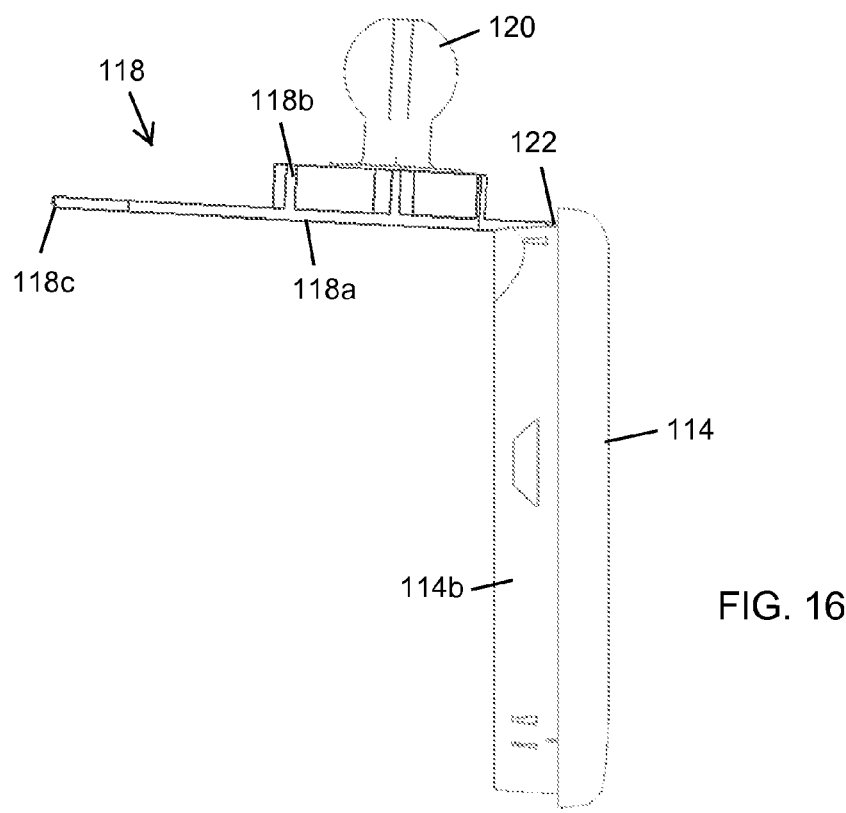
FIG. 16 is a side elevation of the mounting element and bezel portion of FIG. 14.

Thus, the bezel portion 114 and mirror mounting portion 118 may be unitarily formed and may be joined together at the living hinge portions 122. For example, the bezel portion and mirror mounting portion may be formed or molded of a polymeric material, such as a polyolefin material, such as a polypropylene material, and may be injection molded of the polymeric material. The ball portion 120 may be inserted into the Mold and the mirror mounting portion may be overmolded around a base portion 120a of the ball portion to retain ball portion 120 at mirror mounting portion 118. The bezel portion 114 and mirror mounting portion 118 construction thus may be provided in an open configuration, such as shown in FIGS. 14-16, for receiving the reflective element 116 therein. When in the open configuration, the reflective element 116 may be received in the bezel portion, with a front surface of a perimeter edge region of the reflective element contacting and being encompassed by a front lip 114a (FIG. 14) of bezel portion 114 and with the perimeter edges of the reflective element being received in and encompassed by a side wall region or portion 114b of bezel portion 114.

When the reflective element 116 is received in bezel portion 114, mirror mounting portion 118 may be folded or pivoted about living hinge portions 122 to its closed or use position, where the attachment plate 118a is disposed at and along the rear surface of the reflective element, and may function to assist in retaining the reflective element in the bezel portion 114. When the mirror mounting portion 118 is pivoted to its closed or use position, the tabs 118c engage and may snap into a corresponding tab or notch 114c (FIG. 14) at a side wall region 114b of bezel portion 114 to secure the mirror mounting portion 118 in its closed or use position relative to the bezel portion and reflective element. In the illustrated embodiment, hinge portions 122 are disposed at and spaced apart along an upper perimeter region of bezel portion 114 (and formed at cutaway regions of the side wall 114b of bezel portion 114) and notches 114b are disposed at and spaced apart along a lower perimeter region of bezel portion 114, with the mirror mounting portion 118 being pivotable about a generally horizontal pivot axis at the upper perimeter region of the bezel portion. However, clearly the mirror mounting portion may be hingedly attached or joined to the bezel portion at other perimeter regions of the bezel portion (such as at a side or lower perimeter region) and may engage notches or the like at other perimeter regions of the bezel portion (such as at a side or upper perimeter region), while remaining within the spirit and scope of the present invention.

When the reflective element is received in the bezel portion and the attachment plate is folded over the rear of the reflective element, the bezel and mirror mounting element construction may be attached to a mirror casing. For example, the side wall region of the bezel portion may be received in a front opening of a mirror casing and may snapped to the mirror casing and/or otherwise secured relative to the mirror casing to assemble the mirror head or assembly. The mirror casing thus overlaps the perimeter wall region of the bezel portion and the living hinge elements such that the living hinge elements are not viewable when the mirror is assembled.

Optionally, and as shown in FIG. 9, the mirror assembly may include a circuit element 124 (such as a printed circuit board or the like) with circuitry established thereat for powering and/or controlling one or more electronic features or accessories associated with the mirror assembly. In the illustrated embodiment, the reflective element 116 comprises an electro-optic mirror reflective element, such as an electrochromic mirror reflective element or cell (having a front substrate and a rear substrate with an electrochromic medium established therebetween, and with conductive coatings at the surfaces of the substrates facing the electrochromic medium, such as utilizing known aspects of electrochromic reflective elements and/or aspects of the electro-optic reflective elements discussed below), and the circuit element 124 includes terminals or connectors 124a for electrically connecting to electrode clips 126 or the like at the conductive surfaces of the reflective element via electrically conductive wires or leads 124b, such as in a known manner or such as by utilizing aspects of the mirror assemblies described in U.S. Pat. Nos. 7,274,501; 7,255,451; 7,195,381; 7,184,190; 5,668,663; 5,724,187 and/or 6,690,268, and/or U.S. patent application Ser. No. 11/226,628, filed Sep. 14, 2005, which published on Mar. 23, 2006 as U.S. Patent Publication No. 2006/00061008; Ser. No. 10/538,724, filed Jun. 13, 2005, which published on Mar. 9, 2006 as U.S. Patent Publication No. 2006/0050018, and/or PCT Application No. PCT/US03/29776, filed Sep. 9, 2003 and published Apr. 1, 2004 as International Publication No. WO 2004/026633; Ser. No. 12/578,732, filed Oct. 14, 2009, which published on Apr. 22, 2010 as U.S. Publication No. 2010/0097469; and/or Ser. No. 12/576,550, filed Oct. 12, 2009, now U.S. Pat. No. 8,465,161, and/or PCT Application No. PCT/US2010/029173, filed Mar. 30, 2010, which are all hereby incorporated herein by reference in their entireties. Optionally, the circuit element 124 may be attached to the bezel portion and/or the mirror mounting portion, whereby the bezel and reflective element subassembly may be readily assembled to or attached to the mirror casing.

Therefore, the mirror assembly of the present invention provides a bezel and integrated attachment plate with an insert molded ball portion. The bezel and integrated attachment plate uses a living hinge that will be covered by the mirror casing or housing after assembly. Such a configuration may increase manufacturing efficiencies by eliminating an extra part while providing the benefits of the mounting ball being directly attached to the attachment plate or mirror mounting portion and reflective element. Such a construction also enhances the assembly processes because the living hinge controls the assembly location of the attachment plate and ball member relative to the bezel portion, and the attachment plate and ball member may be readily snapped into their designed locations by folding the mounting element at the living hinge and snapping the tabs into the notches at the bezel portion.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005; and/or Ser. No. 10/538,724, filed Jun. 13, 2005, and/or PCT Application No. PCT/US03/29776, filed Sep. 9, 2003 and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004 and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177; and/or 7,255,451; and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published on Dec. 2, 2004, as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assemblies and mounting assemblies of the present invention may be utilized with an accessory module or windshield electronics module or the like, and the mirror assembly may mount to the module (such as to a mirror mounting button at the rear surface of the accessory module). The accessory module or windshield electronics module may utilize aspects of the modules described in U.S. Pat. Nos. 7,538,316; 7,446,650; 7,188,963; 7,004,593; 6,824,281; 6,774,356; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 and published Jul. 15, 2004 as International Publication No. WO 2004/058540, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, the mirror assembly may include user interface inputs, such as buttons or switches or touch or proximity sensors or the like, with which a user may adjust one or more characteristics of the imaging sensor and/or imaging system, such as via the principles described in U.S. patent application Ser. No. 12/091,525, filed Apr. 25, 2008, now U.S. Pat. No. 7,855,755; and/or Ser. No. 11/239,980, filed Sep. 30, 2005, now U.S. Pat. No. 7,881,496, and/or U.S. provisional application Ser. No. 60/618,686, filed Oct. 14, 2004, which are hereby incorporated herein by reference in their entireties. Optionally, the images captured by the imaging sensor or camera may be processed by the control to extract information or data for different applications or systems, such as described in U.S. patent application Ser. No. 11/239,980, filed Sep. 30, 2005, now U.S. Pat. No. 7,881,496, and/or U.S. provisional application Ser. No. 60/618,686, filed Oct. 14, 2004, which are hereby incorporated herein by reference in their entireties.

The interior rearview mirror assembly may include a bezel portion and casing, such as described above, or the mirror assembly may comprise other types of casings or bezel portions or the like, such as described in U.S. Pat. Nos. 7,249,860; 6,439,755; 4,826,289; and 6,501,387; and/or PCT Application No. PCT/US2004/015424, filed May 18, 2004 and published on Dec. 2, 2004, as International Publication No. WO 2004/103772; and/or U.S. patent application Ser. No. 10/993,302, filed Nov. 19, 2004, now U.S. Pat. No. 7,338,177; and/or Ser. No. 12/576,550, filed Oct. 12, 2009, now U.S. Pat. No. 8,465,161, which are all hereby incorporated herein by reference in their entireties, without affecting the scope of the present invention. For example, the mirror assembly may comprise a flush or frameless or bezelless reflective element, such as the types described in U.S. Pat. Nos. 7,626,749; 7,360,932; 7,255,451; 7,274,501; and/or 7,184,190, and/or in PCT Application No. PCT/US2004/015424, filed May 18, 2004 and published on Dec. 2, 2004, as International Publication No. WO 2004/103772; PCT Application No. PCT/US03/35381, filed Nov. 5, 2003 and published May 21, 2004 as International Publication No. WO 2004/042457; and/or in U.S. patent application Ser. No. 11/226,628, filed Sep. 14, 2005, which published on Mar. 23, 2006 as U.S. Patent Publication No. 2006/00061008; and/or Ser. No. 10/538,724, filed Jun. 13, 2005, which published on Mar. 9, 2006 as U.S. Patent Publication No. 2006/0050018, and/or in PCT Application No. PCT/US2010/032017, filed Apr. 22, 2010, and/or in PCT Application No. PCT/US10/51741, filed Oct. 7, 2010, which are all hereby incorporated herein by reference in their entireties.

Optionally, the mirror assembly may comprise a modular mirror construction, and may include back housing portions or the like, such as cap portions of the types described in PCT Application No. PCT/US2004/015424, filed May 18, 2004 and published on Dec. 2, 2004, as International Publication No. WO 2004/103772, which is hereby incorporated herein by reference in its entirety. Optionally, a display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the mirror casing and/or reflective element may include customized or personalized viewable characteristics, such as color or symbols or indicia selected by the vehicle manufacturer or owner of the vehicle, such as the customization characteristics described in PCT Application No. PCT/US2004/015424, filed May 18, 2004 and published on Dec. 2, 2004, as International Publication No. WO 2004/103772; and/or U.S. Pat. Nos. 7,626,749 and/or 7,255,451 and/or U.S. patent application Ser. No. 11/243,783, filed Oct. 5, 2005 and published Apr. 20, 2006 as U.S. Publication No. 2006/0082192, which are hereby incorporated herein by reference in their entireties. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in PCT Application No. PCT/US2004/015424, filed May 18, 2004 and published on Dec. 2, 2004, as International Publication No. WO 2004/103772; and/or U.S. Pat. No. 7,626,749 and/or U.S. patent application Ser. No. 11/243,783, filed Oct. 5, 2005 and published Apr. 20, 2006 as U.S. Publication No. 2006/0082192, which are hereby incorporated herein by reference in their entireties. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,581,859; 7,195,381; 6,690,298; 5,668,663 and/or 5,724,187, and/or in U.S. patent application Ser. No. 11/226,628, filed Sep. 14, 2005, which published on Mar. 23, 2006 as U.S. Patent Publication No. 2006/00061008; Ser. No. 10/993,302, filed Nov. 19, 2004, now U.S. Pat. No. 7,338,177; and/or Ser. No. 12/091,525, filed Apr. 25, 2008, now U.S. Pat. No. 7,855,755, and/or in PCT Application No. PCT/US03/29776, filed Sep. 19, 2003 and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. Pat. No. 7,338,177, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Such a video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 10/538,724, filed Jun. 13, 2005, which published on Mar. 9, 2006 as U.S. Patent Publication No. 2006/0050018; Ser. No. 11/226,628, filed Sep. 14, 2005, which published on Mar. 23, 2006 as U.S. Patent Publication No. 2006/00061008; Ser. No. 12/091,525, filed Apr. 25, 2008, now U.S. Pat. No. 7,855,755; Ser. No. 09/585,379, filed Jun. 1, 2000; and/or Ser. No. 10/207,291, filed Jul. 29, 2002, which are hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the mirror assembly and/or mounting structure may include a forward facing imaging sensor or camera that may be mounted at a circuit element or substrate supported at the mirror assembly or mounting base or the like. The camera may include a sensor chip or imager chip or sensing element established at the circuit board or element, with a lens barrel extending from the chip in the direction of the forward field of view of the sensor. Such cameras are typically used in the likes of automatic headlamp control, lane departure warnings systems, traffic sign recognition systems and/or the like (such as by utilizing aspects of the vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and/or 6,824,281, which are all hereby incorporated herein by reference in their entireties). Optionally, it is envisioned that the mirror assembly and/or mounting assembly may support any suitable or appropriate or selected sensor or accessory, such as a radar sensor, a photosensor, a lidar sensor or the like, while remaining within the spirit and scope of the present invention. Optionally, for example, the sensor may utilize aspects of the sensors and/or systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and/or 6,824,281, and/or PCT Application No. PCT/US08/51833, filed Jan. 24, 2008 and published Oct. 23, 2008 as International Publication No WO 2008/127752, and/or PCT Application No. PCT/US2010/25545, filed Feb. 26, 2010 and published Sep. 2, 2010 as International Publication No. WO 2010/099416, which are all hereby incorporated herein by reference in their entireties.

Optionally, the mirror assembly may include or may be associated with a compass sensor and circuitry for a compass system that detects and displays the vehicle directional heading to a driver of the vehicle. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. Pat. Nos. 7,329,013; 7,370,983 and/or 7,004,593, and/or U.S. patent application Ser. No. 12/906,519, filed Oct. 18, 2010, now U.S. Pat. No. 8,282,226, and/or Ser. No. 11/226,628, filed Sep. 14, 2005, which published on Mar. 23, 2006 as U.S. Patent Publication No. 2006/00061008, which are hereby incorporated herein by reference in their entireties, which are hereby incorporated herein by reference in their entireties, and/or such as by utilizing aspects of an EC driver-on-a-chip such as described in U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009, which published on Apr. 22, 2010 as U.S. Publication No. 2010/0097469, which is hereby incorporated herein by reference in its entirety. The wire management system may include a wire management element or channel or cover element, such as by utilizing aspects of the wire management systems or elements described in U.S. patent application Ser. No. 11/226,628, filed Sep. 14, 2005, which published on Mar. 23, 2006 as U.S. Patent Publication No. 2006/00061008; and/or U.S. Pat. Nos. 7,510,287 and/or 7,370,983, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

Optionally, the compass system and compass circuitry may utilize aspects of the compass systems described in U.S. Pat. Nos. 7,370,983; 7,329,013; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or PCT Application No. PCT/US2004/015424, filed May 18, 2004 and published on Dec. 2, 2004, as International Publication No. WO 2004/103772, and/or European patent application, published Oct. 11, 2000 under Publication No. EP 0 1043566, and/or U.S. patent application Ser. No. 11/226,628, filed Sep. 14, 2005, which published on Mar. 23, 2006 as U.S. Patent Publication No. 2006/00061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971, published Sep. 10, 2004 (which is hereby incorporated herein by reference in its entirety), or a Hall-effect sensor, such as the types described in U.S. Pat. Nos. 6,278,271; 5,942,895 and 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; 5,632,092; and/or 7,004,593, and/or PCT Application No. PCT/US2004/015424, filed May 18, 2004 and published on Dec. 2, 2004, as International Publication No. WO 2004/103772, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle (which may be incorporated at or associated with the mounting assembly and/or mirror assembly), such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003 and published Aug. 7, 2003 as International Publication No. WO 03/065084, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published on Dec. 2, 2004, as International Publication No. WO 2004/103772, which are hereby incorporated herein by reference in their entireties.

Optionally, the user inputs of the mirror assembly may comprise any suitable types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 7,527,403; 7,360,932 and/or 7,253,723; and/or U.S. patent application Ser. No. 12/576,550, filed Oct. 12, 2009, now U.S. Pat. No. 8,465,161, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005; and/or PCT Application No. PCT/US03/30877, filed Oct. 1, 2003 and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,526,103; 7,400,435; 6,690,268 and 6,847,487; and/or U.S. provisional application Ser. No. 60/618,686, filed Oct. 14, 2004, and/or U.S. patent application Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; and 7,004,606; and/or U.S. patent applications, Ser. No. 11/315,675, filed Dec. 22, 2005 and published Aug. 17, 2006 as U.S. Patent Publication No. US-2006-0184297A1; Ser. No. 10/534,632, filed May 11, 2005 and published Aug. 3, 2006 as U.S. Patent Publication No. US-2006-0171704-A1; Ser. No. 12/091,359, filed Jun. 10, 2008; and/or Ser. No. 12/377,054, filed Feb. 10, 2009; and/or PCT Application No. PCT/US2006/041709 filed Oct. 27, 2006 and published May 10, 2007 as PCT Publication No. WO 07/053404; and/or PCT Application No. PCT/US2007/75702, filed Aug. 10, 2007 and published Feb. 28, 2008 as PCT Publication No. WO 08/024639, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005; and/or PCT Application No. PCT/US2006/041709, filed Oct. 27, 2006 and published May 10, 2007 as International Publication No. WO 07/053404; and/or PCT Application No. PCT/US2003/036177 filed Nov. 14, 2003 and published Jun. 3, 2004 as PCT Publication No. WO 2004/047421, which are hereby incorporated herein by reference in their entireties.

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:

a mirror head comprising a mirror casing and a reflective element;

a mounting assembly for adjustably mounting said mirror head at an interior portion of a vehicle that is equipped with said mirror assembly;

wherein said mounting assembly comprises a mounting structure that is attachable to an interior portion of the equipped vehicle;

wherein said mounting assembly comprises a mirror mounting element pivotally attached at an end of said mounting structure to establish a mirror ball pivot joint and wherein said end of said mounting structure at which said mirror mounting element is attached is opposite the interior portion of the equipped vehicle when said mounting structure is attached to the interior portion of the equipped vehicle;

wherein said mirror casing comprises a non-circular receiving portion configured to receive a non-circular attaching portion of said mirror mounting element;

wherein said non-circular attaching portion comprises at least one locking tab protruding radially outward therefrom;

wherein said attaching portion of said mirror mounting element is configured to attach to said receiving portion via at least one of (a) a snap connection, (b) a twist connection and (c) a bayonet connection;

wherein said receiving portion of said mirror casing includes at least one stop that, when said attaching portion engages said at least one stop as said attaching portion is inserted into said receiving portion, limits insertion of said attaching portion into said receiving portion of said mirror casing;

wherein, with said attaching portion received in said receiving portion and engaged with said at least one stop, said at least one locking tab engages a locking tab of said mirror casing to limit retraction of said attaching portion from said receiving portion; and wherein said attaching portion of said mirror mounting element, when said mirror mounting element is attached at said end of said mounting structure, is attachable to said receiving portion of said mirror casing of said mirror head from a position rearward of said mirror casing and from the exterior of said mirror casing to pivotally attach said mirror head at said end of said mounting structure.

2. The interior rearview mirror assembly of claim 1, wherein said mirror mounting element comprises a ball portion and said attaching portion, and wherein said ball portion is pivotally received at said end of said mounting structure.

3. The interior rearview mirror assembly of claim 2, wherein said ball portion is insert molded at said attaching portion.

4. The interior rearview mirror assembly of claim 3, wherein said mounting structure comprises a mounting base attachable to the interior portion of the equipped vehicle and a mounting arm attached at said mounting base, and wherein said end of said mounting structure comprises an end of said mounting arm opposite said mounting base, said end of said mounting arm receiving said ball portion of said mirror mounting element therein to pivotally attach said mirror mounting element at said end of said mounting arm.

5. The interior rearview mirror assembly of claim 4, wherein said mounting arm is pivotally attached at said mounting base to provide a double pivot mounting assembly.

6. The interior rearview mirror assembly of claim 5, wherein said mounting base is attachable to a mirror mounting button adhesively attached at an in-cabin surface of a windshield of the equipped vehicle.

7. The interior rearview mirror assembly of claim 1, wherein said mounting structure comprises a mirror mount attachable to a mirror mounting button adhesively attached at an in-cabin surface of a windshield of the equipped vehicle, and wherein said mirror mounting element is pivotally attached at said end of said mirror mount.

8. The interior rearview mirror assembly of claim 1, wherein said mirror mounting element comprises a ball receiving portion and said attaching portion, and wherein said ball receiving portion of said mirror mounting element pivotally receives a ball member of said end of said mounting structure to pivotally attach said mirror mounting element to said mounting structure.

9. The interior rearview mirror assembly of claim 8, wherein said ball receiving portion and said attaching portion of said mirror mounting element are unitarily molded together in the same molding process.

10. The interior rearview mirror assembly of claim 1, wherein said attaching portion of said mirror mounting element is configured to attach to said receiving portion of said mirror head via a snap connection.

11. The interior rearview mirror assembly of claim 1, wherein said attaching portion of said mirror mounting element is configured to attach to said receiving portion of said mirror head via a twist connection.

12. The interior rearview mirror assembly of claim 11, wherein said twist connection comprises a twist lock connection.

13. The interior rearview mirror assembly of claim 1, wherein said mirror mounting element comprises a passageway therethrough for routing an electrically conductive wire therethrough to electrically connect said electrically conductive wire to circuitry of said mirror head.

14. The interior rearview mirror assembly of claim 1, wherein said mounting structure is attachable to a mirror mounting button adhesively attached at an in-cabin surface of a windshield of the equipped vehicle.

15. The interior rearview mirror assembly of claim 1, wherein said mounting structure comprises a mirror mount attachable to said mounting button.

16. The interior rearview mirror assembly of claim 1, wherein said attaching portion of said mirror mounting element is configured to attach to said receiving portion of said mirror head via a fastenerless connection.

17. The interior rearview mirror assembly of claim 16, wherein said attaching portion of said mirror mounting element is configured to attach to said receiving portion of said mirror head via a twist connection.

18. The interior rearview mirror assembly of claim 17, wherein said twist connection comprises a twist lock connection.

19. The interior rearview mirror assembly of claim 1, wherein said attaching portion comprises at least two locking tabs protruding radially outward from opposite sides of said non-circular attaching portion, and wherein, with said attaching portion received in said receiving portion and engaged with said at least one stop, said at least two locking tab engage respective locking tabs of said mirror casing to limit retraction of said attaching portion from said receiving portion.

20. The interior rearview mirror assembly of claim 19, wherein said receiving portion of said mirror casing includes at least two stops disposed at opposite sides of said receiving portion to limit insertion of said attaching portion into said receiving portion.

21. The interior rearview mirror assembly of claim 20, wherein said stops limit insertion of said attaching portion into said receiving portion such that, when said attaching portion is inserted into said receiving portion and engaged with said stops, said attaching portion is spaced from and not engaged with said reflective element.

22. The interior rearview mirror assembly of claim 21, comprising circuitry established on a circuit board disposed in said mirror casing.

23. The interior rearview mirror assembly of claim 22, wherein said circuit board is disposed in said mirror casing such that said circuit board is remote from said attaching portion when said attaching portion is inserted into said receiving portion.

* * * * *

UNITED STATES PATENT AND TRADEMARK OFFICE
CERTIFICATE OF CORRECTION

| | | |
|---|---|---|
| PATENT NO. | : 8,851,690 B2 | Page 1 of 1 |
| APPLICATION NO. | : 12/912253 | |
| DATED | : October 7, 2014 | |
| INVENTOR(S) | : John T. Uken et al. | |

It is certified that error appears in the above-identified patent and that said Letters Patent is hereby corrected as shown below:

In the Specification

Column 1
Line 63, "Mirror" should be --mirror--

Column 8
Line 10, "cam-looks" should be --cam-locks--

Column 9
Line 11, "Mold" should be --mold--

Signed and Sealed this
Thirtieth Day of June, 2015

Michelle K. Lee
*Director of the United States Patent and Trademark Office*